United States Patent
Cromie

[15] 3,691,567
[45] Sept. 19, 1972

[54] PROSTHETIC HEART VALVE HAVING A PAIR OF SUPPORT RINGS OF DISSIMILAR MATERIAL

[72] Inventor: Harry W. Cromie, Pittsburgh, Pa.
[73] Assignee: Baxter Laboratories, Inc., Morton Grove, Ill.
[22] Filed: May 7, 1971
[21] Appl. No.: 147,275

[52] U.S. Cl..........................3/1, 3/DIG. 3, 137/533, 137/533.11
[51] Int. Cl..............................................A61f 1/22
[58] Field of Search......3/1, DIG. 3; 137/533, 533.11

[56] References Cited

UNITED STATES PATENTS

| | | | |
|---|---|---|---|
| 3,416,159 | 12/1968 | Smeloff et al.................. | 3/1 |
| 3,509,582 | 5/1970 | Pierie et al..................... | 3/1 |
| 3,524,202 | 8/1970 | Cromie........................... | 3/1 |
| 3,526,005 | 9/1970 | Bokros et al................... | 3/1 |
| 3,579,645 | 5/1971 | Bokros........................... | 3/1 |

Primary Examiner—Richard A. Gaudet
Assistant Examiner—Ronald L. Frinks
Attorney—W. Garrettson Ellis

[57] ABSTRACT

A prosthetic heart valve having an inner support ring of rigid non-thrombogenic material and a malleable metallic outer support ring positioned about the periphery of the inner ring and bent into the immovable clamping relationship therewith. A portion of a tubular fabric member is retained between the two clamped rings, and the remainder of the fabric member is folded into a plurality of layers about the periphery of the outer ring to form a suturing site. Typically, the outer ring carries an outwardly extending flange on one side, which is overlaid by a single thickness of the tubular fabric, to hold the multiple layer suturing site away from the orifice of the inner ring.

9 Claims, 4 Drawing Figures

Inventor
Harry W. Cromie
By W. Garrettson Ellis
Attorney

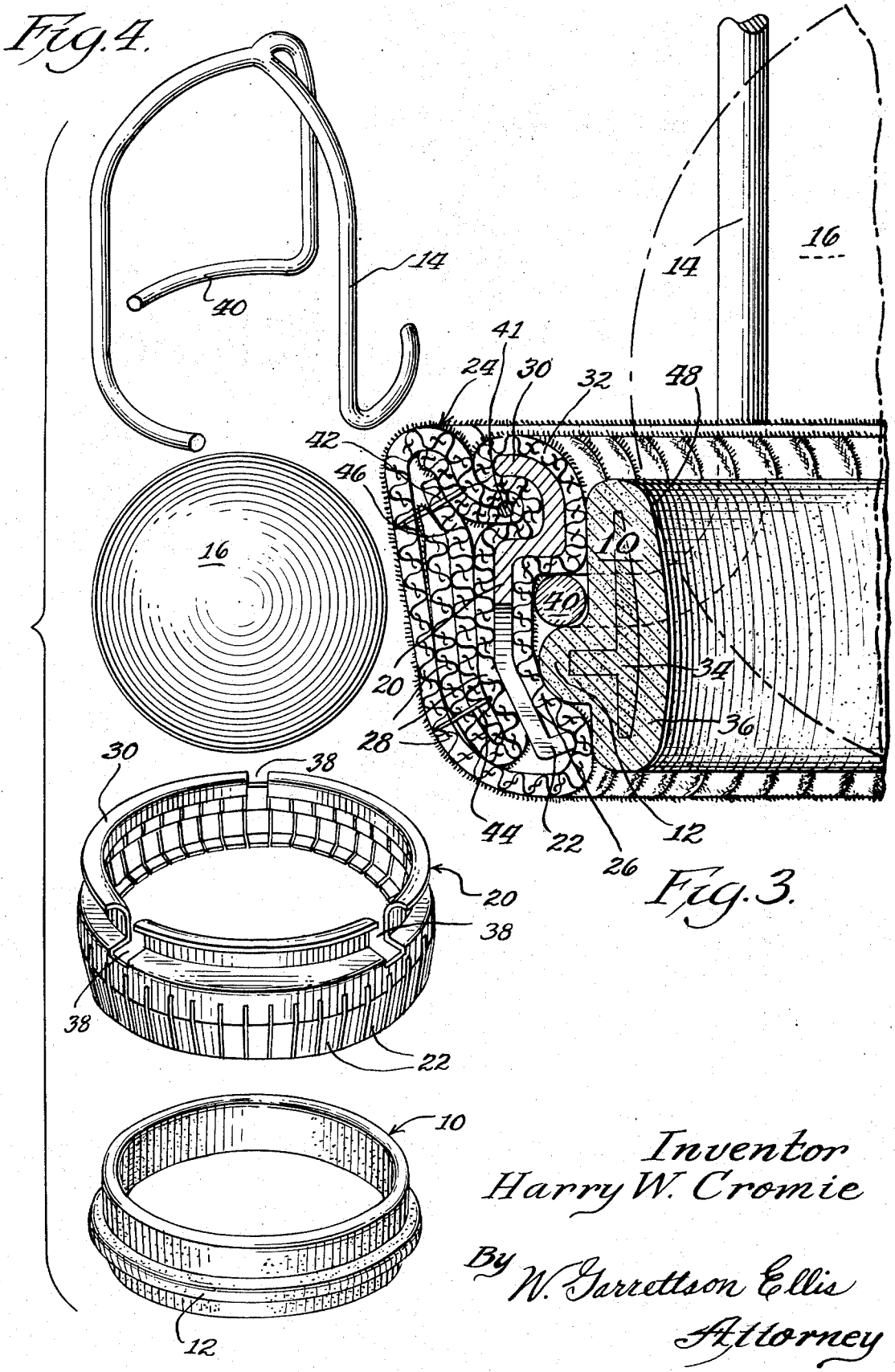

PROSTHETIC HEART VALVE HAVING A PAIR OF SUPPORT RINGS OF DISSIMILAR MATERIAL

BACKGROUND OF THE INVENTION

A need exists in the field of heart valve prostheses for valves which will not exhibit a build-up of clotted blood and fibrin during long term usage. A particularly sensitive area for the build-up of undesirable materials is the ring orifice of the valve through which the blood passes when the orifice is not occluded by the moveable closure member.

It has been suggested in U.S. Pat. No. 3,526,005 that pyrolytic carbon is a particularly excellent coating for medical protheses. Similarly, it is suggested to use carbon parts for heat valves in U.S. Pat. No. 3,526,906. Such materials exhibit a very low tendency to build up undesirable incrustations after implantation in a patient.

However, difficulties have been encountered in the effective design of heat valves in which the blood orifice is made of carbon or another non-malleable, brittle material because of problems in assembling a reliable,strong valve. The brittleness of carbon or the like prevents the use of the best conventional methods of valve fabrication developed for use with malleable metal orifice rings.

Furthermore, when a suturing ring of the type disclosed by the prior art, for example U.S. Pat. Nos. 3,099,016 or 3,416,159, is used in conjunction with the heart valve, there is a danger that the surgeon may emplace suture stitches very close to the orifice of the valve. After implantation, these stitched sutures may enlarge or move, and interfere with the action of the movable closure member. This may result in a hazardous malfunction of the heart valve.

The heart valve of this invention provides an improved solution to the above problems, in that a valve is provided which can carry a rigid valve orifice assembly, so that the valve orifice can be fabricated from the most desirable formulations of non-thrombogenic carbon or ceramic, while the valve orifice assemble remains reliable mounted within an outer suturing ring. Additionally, the suturing ring of the valve of this invention can be held away from the valve orifice in a manner to reduce the risk of the sutures interfering with the action of the moveable closure member.

DESCRIPTION OF THE INVENTION

In the drawing,

FIG. 3 is a partial magnified, sectional view of the valve rings and related parts of the valve of FIG. 1 shown in greater detail.

FIG. 4 is an exploded view of the major components of the valve of FIG. 1 prior to assembly, omitting the tubular fabric member which is used as a suturing ring.

Figure 1:
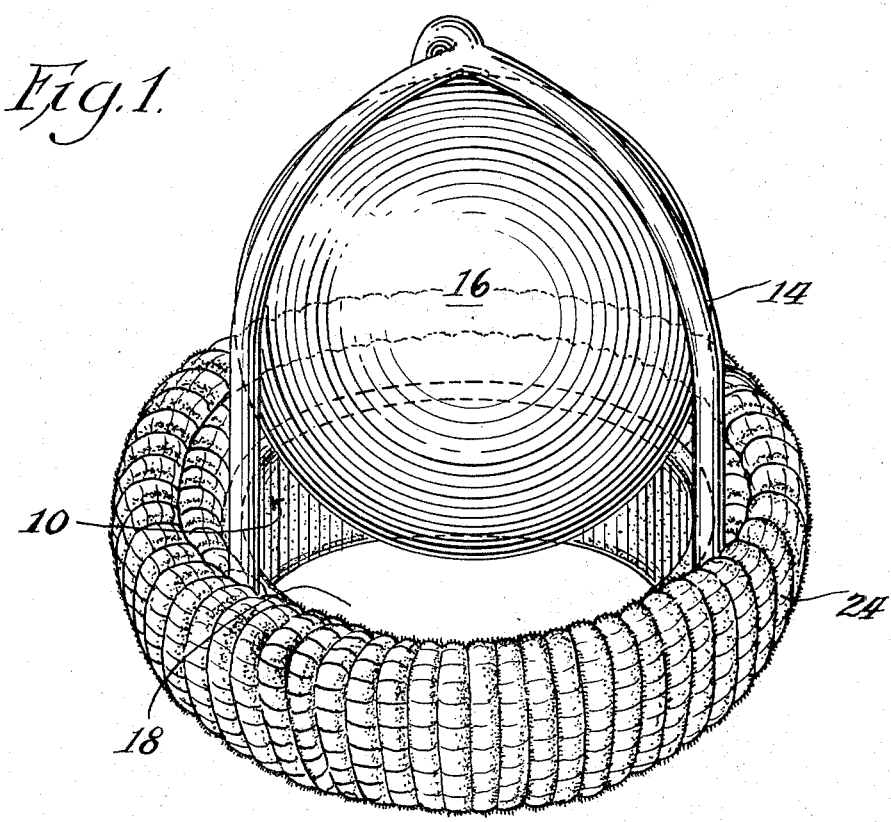
FIG. 1 is a perspective view of a prosthetic aortic heart valve constructed in accordance with this invention.
Figure 2:
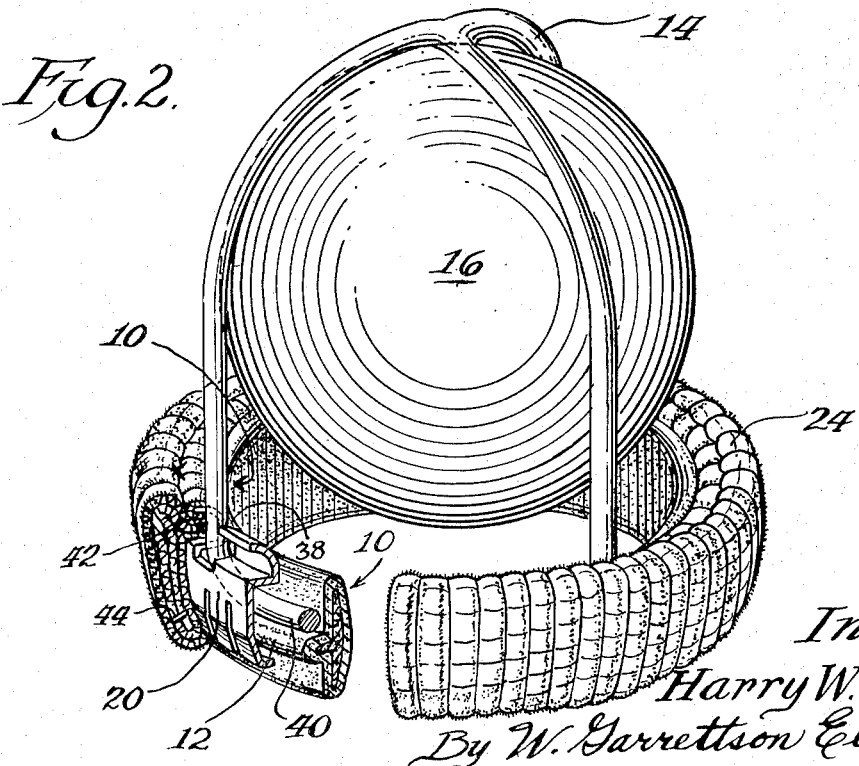
FIG. 2 is a perspective view of the same valve with portions of the valve broken away for purposes of clarity.

Referring to the drawings, a prosthetic heart valve is shown which comprises an inner support ring 10 of rigid non-thrombogenic material. Inner ring 10 defines an annular protrusion 12 about its outer periphery, and carries a cage 14 on one side of said inner ring to retain a closure member 16 therein within said cage and moveable between a position occluding flow through the orifice 18 of the inner ring and an open, flow permitting position.

Malleable metallic outer support ring 20 is positioned about the periphery of inner ring 10, and has a plurality of spaced fingers 22 positioned transversely to the plane of outer ring 20. As the valve is assembled, fingers 22 are bent about protrusion 12 to affix outer ring 20 in immovable clamping relation with inner ring 10.

A folded tubular fabric member 24 has a portion thereof 26 clamped between inner ring 10 and outer ring 20 as shown in FIG. 3. Other portions of the tubular fabric member are folded into a plurality of layers 28 about the periphery of outer ring 20 to form a suturing site.

Typically, outer ring 20 carries an outwardly extending flange 30 on the side of said ring adjacent the closure member 16. Flange 30 is overlaid by a single thickness 32 of the tubular fabric 24. The purpose of flange 30 is to underlie this thickness of tubular fabric to cause the fabric immediately adjacent to inner ring 10 to be unsuitable as a suturing site, since a surgeon typically requires several layers of fabric in order to obtain reliable suturing of the valve to the heart tissue at the emplacement site. Also, flange 30 holds the folded layers 28 of tubular fabric portion 24 away from the suturing site to reduce the risk that sutures will get too near the valve orifice, and interfere with the action of moveable closure member 16.

Referring in more detail to the parts already mentioned, inner ring 10 is preferably made of a graphite substrate 34 of approximately 10 mils thickness, coated with a layer of isotropic pyrolytic carbon 36 of approximately 20 mils thickness, manufactured, for example, in accordance with the teachings of U.S. Pat. No. 3,526,005. Alternatively, inner ring 10 can be made of a non-thrombogenic ceramic formulation, polytetraflouroethylene, or other non-thrombogenic plastic materials, if desired. The invention finds particular use in utilizing a rigid or even brittle inner support ring 10 having optimum non-thrombogenic characteristics, while the remainder of the valve is clamped to inner ring 10 through the action of outer metallic ring 20. It is also advantageous that outer ring 20 and inner ring 10 are not in contact with each other, but are separated by a layer 26 of fabric, which protects inner ring 10 from cracking or chipping during the manufacturing operation.

Closure member 16 is disclosed as a ball, typically hollow and made of carbon such as graphite with a pyrolytic carbon outer coating. If desired, the pyrolytic carbon coatings used on ring 10 and closure member 16 may contain a minor amount of silicon to increase the strength of the material. Alternatively, a ceramic or plastic ball can be used, or other known closure members such as pivoting or reciprocating discs, poppet valves connected to a projecting neck and slidably held in a retention ring, or the like.

The valve of this invention is typically assembled by positioning the closure member 16 and cage 14 with each strut of cage 14 passing through a cut away portion 38 in outer ring 20, and the horizontal portions 40 of cage 14 resting on protrusion 12 of inner ring 10.

Cage 14 can be made of titanium optionally coated with polytetrafluoroethylene, carbon, or the like. Tubular fabric 24, in unfolded tubular position, is placed about inner ring 10, and outer ring 20 is in turn placed about inner ring 10 and fabric 24. Then fingers 22 of outer ring 20 are bent inwardly to the position shown in FIG. 3 to clamp fabric tube 24 and cage 14 to inner ring 10.

Fabric tube 24 is typically made of dacron velour, or any other sturdy, desirable fabric.

Following the clamping of fingers 22, the two tubular sections of fabric tube 24 extending outwardly from the clamped rings 10, 20 on different sides thereof are folded together about rings 10, 20, and thin retainer ring 41, in the manner indicated in FIG. 3, and sewn about the entire periphery of the valve along circular seams 42, 44 to retain the fabric in its folded position as a suturing ring. An additional, separate ring of fabric 46 can be added to the folded composite to provide extra bulk to the suturing ring if desired.

In the assembled valve, inner ring 10 presents to closure member 16 a convex curved surface 48 along the vertical dimension, whereby a line contact between the closure member and inner ring 10 is effected when closure member 16 is in flow occluding position as shown in FIG. 3.

The completed heart valve is sterilized in an autoclave or gas sterilized with ethylene oxide, and prepared for suturing into the incision site.

Mitral or aortic valves can be constructed in accordance with this invention, having a valve orifice of rigid non-thrombogenic material which is securely held together with a malleable clamping ring, and in which the fabric suturing ring is prevented from interfering with the action of the closure member.

The above disclosure is for illustrative purposes only, and is not to be considered as limiting the invention of this application, which is defined in the claims below.

That which is claimed is:

1. A prosthetic heart valve which comprises an inner support ring of rigid, nonthrombogenic material, said inner ring defining an annular protrusion about its periphery; a closure member retained adjacent said inner ring and movable between a position occluding flow through said inner ring and an open, flow-permitting position; a malleable metallic outer support ring positioned about the periphery of said inner ring and having a plurality of fingers which are bent about said protrusion to affix said outer ring in immovable, clamping relation with said inner ring; a tubular fabric member, a portion of which is clamped between said inner and outer rings, other portions of said tubular fabric member being folded into a plurality of layers about the periphery of said outer ring to form a suturing site.

2. The valve of claim 1 in which said inner ring is made of carbon.

3. The valve of claim 2 in which said inner ring has an outer coating of an isotropic pyrolytic carbon.

4. The valve of claim 1 in which said outer ring carries an outwardly extending flange on a side of said ring adjacent said closure member, said flange being overlaid by a single thickness of tubular fabric, to cause fabric immediately adjacent the inner ring to be unsuitable as a suturing site, and to hold the folded tubular fabric portions away from the inner ring.

5. The valve of claim 4 in which said closure member is a hollow ball.

6. The valve of claim 5 in which said ball is made of carbon.

7. The valve of claim 5 in which the inner ring presents a convex curved surface along one dimension to said hollow ball, whereby a line contact between the ball and inner ring is effected when said ball is in flow occluding position.

8. The valve of claim 7 having a cage for retaining said ball, said cage comprising struts which rest on said protrusion and which are retained between said inner and outer rings.

9. The valve of claim 8 in which both said inner ring and ball have an outer coating of an isotropic pyrolytic carbon.

* * * * *